| United States Patent [19] | [11] | 4,182,732 |
|---|---|---|
| Fry | [45] | Jan. 8, 1980 |

[54] THERMOSETTING PHENOLIC RESIN COATING AND ADHESIVE COMPOSITIONS

[75] Inventor: John S. Fry, Hillsborough Township, Somerset County, N.J.

[73] Assignee: Union Carbide Corporation, New York, N.Y.

[21] Appl. No.: 837,494

[22] Filed: Sep. 28, 1977

[51] Int. Cl.$^2$ .......................... C08G 8/20; C08L 61/12
[52] U.S. Cl. ................................ 525/482; 528/140; 528/147; 528/153
[58] Field of Search ............... 260/841, 847, 832, 833, 260/51 R, 826, 838, 831; 528/140, 147, 153

[56] References Cited

U.S. PATENT DOCUMENTS

| 3,640,958 | 2/1972 | Soldatos | 260/59 |
|---|---|---|---|
| 3,657,188 | 4/1972 | Perkins | 528/140 X |
| 3,816,558 | 6/1974 | Huck | 260/841 |
| 4,020,040 | 4/1977 | Kattoh et al. | 260/847 |
| 4,116,921 | 9/1978 | Olivo et al. | 528/140 X |

FOREIGN PATENT DOCUMENTS 402911 12/1965 Australia .

*Primary Examiner*—Sandra M. Person
*Attorney, Agent, or Firm*—Franklyn Schoenberg

[57] ABSTRACT

A coating and adhesive composition that may be in finely divided powder form is provided comprising a solid phenolic resole (one-step) resin having a gel time of between 150 seconds to about 250 seconds at 150° C., said resin being the reaction product of bisphenol-A and formaldehyde at a mole ratio between about 2.11 to 2.64 moles of formaldehyde per mole of bisphenol-A in the presence of a catalytic quantity of a condensation catalyst at a temperature of at least about 70° C. that is acidified to a pH from about 3 up to 7 and dehydrated.

11 Claims, No Drawings

THERMOSETTING PHENOLIC RESIN COATING AND ADHESIVE COMPOSITIONS

The present invention relates to thermosetting adhesive and coating compositions, and more particularly to thermosetting compositions which comprise solid resins that can be cured without the addition of curing or crosslinking agents and which possess a combination of unique characteristics making them suitable for use as adhesives and coatings.

Thermosetting resins, such as phenolics, expoxies and the like, are widely used as adhesive and coating materials, either alone or in combination with other polymers. Heretofore, these materials have, in general, been applied in liquid form wherein the resin composition is in a solvent solution which must be dried or is a liquid that must be gelled, prior to curing by application of heat. To eliminate the need for solvents for both ecological and economic reasons, or to avoid the problems associated with gelling a liquid coating, it would be highly desirable to obtain thermosetting resins in either 100 percent solids powder or film form which are one package, storage stable materials that could be used as an adhesive and coating material having or producing the following characteristic and/or results:

1. An initial light color and the ability to be pigmented to pastel shades.
2. Good color stability even when heated and exposed to ultraviolet light.
3. Low in extractable materials and attendant staining of porous substrates.
4. Stronger adhesion to metal and non-metallic substrates, especially at elevated temperatures.
5. Have the ability to withstand storage without sintering or agglomerating for extended periods of time.
6. Possess the appropriate fluidity and surface wetting characteristics to form a relatively uniform and continuous coating over a substrate including high spots and sharp edges.
7. Have the ability to rapidly cure to an infusible, tough state when brought to a selected cure temperature.

Most "one-step" phenol-formaldehyde phenolic resins based on phenol or substituted phenols such as cresol, butyl, phenol, octyl phenol, etc., or copolymers thereof, that heretofore have been available for making useful adhesive and coating materials do not satisfy all of the criteria recited above. In general, for example, they possess a dark initial color and poor stability as well as presenting color bleed-through problems. Moreover, reactive resins containing a sufficient level of methylol groups for good crosslinking response are soft, or even liquid, and therefore are not suitable for preparing in powder form. Thermosetting resins which are produced by reacting bisphenol-A and formaldehyde are also well known and described widely in the technical and patent literature. [See, for example, the following U.S. Pat. Nos. 1,225,748; 1,614,172; 1,637,512; 1,873,849; 1,933,124; 1,948,469; 1,970,912; 2,017,877; 2,031,557; 2,050,366; 2,059,526; 2,070,148; 2,079,210; 2,079,606; 2,169,361; 2,279,526; 2,389,078; 2,464,207; 2,552,569; 2,621,164; 2,623,891; 2,667,466; 2,854,415; 3,000,847; 3,024,285; 3,080,331; 3,159,597; 3,211,652; 3,264,266; 3,390,128; 3,586,735; and 3,644,269.] Though various reactions of formaldehyde with bisphenol-A are described there is no description of a resin, or composition containing the same, possessing all the hereinabove described criteria. Many have described novalak (2-step) resins from these reactants which are generally suggested as tackifiers in adhesives. Resole (1-step) resins described in the literature are generally recommended for varnish application in solvent systems, but none of these are in solid form suitable for use as "powder" coating and adhesives, due to the sintering or agglomeration thereof.

In copending application, Ser. No. 757,061, of A. R. Olivio et al., filed Jan. 5, 1977 now U.S. Pat. No. 4,116,921, there is disclosed a reaction product of bisphenol-A and formaldehyde which is used solely in the preparation of "one-step" molding compositions that are particularly suitable for use in "warm-runner" injection molding application. The resins of the invention are disclosed as having improved color characteristics and molding compositions prepared therefrom are disclosed as having good injection molding properties and crosslinking response, but no teaching is provided for preparing resins that would satisfy the criteria of adhesive and/or coating compositions recited hereinabove.

In accordance with the present invention there is provided a coating and adhesive composition comprising a solid phenolic resole resin having a gel time of between about 150 seconds to about 250 seconds at 150° C., said resin being the reaction product of 2,2-bis(4-hydroxyphenyl) propane (hereinafter called Bisphenol A or Bis-A) and formaldehyde at the mole ratio of from about 2.11 to about 2.64 moles of formaldehyde per mole of Bis-A in the presence of a catalytic quantity of a condensation catalyst selected from the group consisting of an alkali metal hydroxide, barium oxide, and barium hydroxide at a temperature of at least about 70° C. that is acidified to a pH of from about 3 up to 7.0 and dehydrated.

It has been discovered that the solid resole phenolic resin of the present invention is light colored and color stable, exhibits improved heat resistance and high temperature adhesion properties to a variety of substrates and is suitable as a 100% solids adhesive and coating composition having excellent storage stability when prepared in powder form or, if desired, may also be employed as an adhesive and coating composition in solution form. Moreover, the resin composition exhibits excellent curing response without the need for catalyst additives and may be mixed with one or more other reactive polymers to prepare compositions useful for an even broader range of applications.

Suitable solid resole phenolic resins of the present invention having a gel time of between about 150 seconds and 250 seconds at 150° C. are the reaction product of formaldehyde and bisphenol-A at the mole ratio between about 2.11 and 2.64 moles of formaldehyde per mole bisphenol-A in the presence of a catalytic amount of an alkali metal hydroxide, barium hydroxide, or barium oxide catalyst.

It is essential that the formaldehyde and bisphenol-A reactants be in the mole ratio of between 2.11 and 2.64 moles of formaldehyde per mole of bisphneol-A. Lower amounts of formaldehyde result in a reaction product having unsuitable curing or crosslinking response, and greater amount of formaldehyde will result in a product that is unsuitably hydroscopic as well as having an unsuitably excessive aldehyde odor. It has been determined that the reaction between formaldehyde and bisphenol-A should be carried out by mixing them with a catalytic amount of an alkali metal hydroxide, or barium hydroxide or oxide catalyst such that the reaction mixture has a pH of from about 8 to about 10. To yield a pH within this range, the catalyst should be employed in amounts from about 0.005 to about 0.2 equivalents of hydroxyl, i.e., $OH^{(-)}$, per mole of bisphenol-A. It has been further determined that the reaction mixture must thereafter be treated with an acid to reduce the pH of the resin solution below about 7, desirably between about 3 to about 6.5, and preferably between 4 and 5. The preferred acids are the mineral acids, such as sulfuric, phosphoric, phosphorus acids, and the like, and carboxylic acids such as lactic acid, citric acid, trichloroacetic acid, monochloroacetic acid, oxalic acid, and the like. The most preferred acids for neutralization are phosphoric acid, sulfuric acid, lactic acid, and citric acid.

In a preferred embodiment, the initial mixture of bisphenol-A and formaldehyde is achieved at a temperature below rapid condensation and the mixture is then brought to the condensation temperature, with stirring. Usually the reaction temperature is at least 80° C., and preferably between about 90° C. to 100° C., although slightly lower temperatures, e.g., as low as about 70° C. can be used in some cases, especially when higher proportions of catalyst are used. Preferably, temperature is controlled by operating the reaction at reflux under reduced or atmospheric pressure. The reaction is continued until the desired degree of reaction is achieved; this can range from about 30 minutes to one hour, or longer. Generally, the degree of reaction is predicated upon the gel time sought.

Once the initial reaction is completed, the product is neutralized with acid to a pH below about 7 and then stripped of water and unreacted materials by heating to temperatures at least 80° C., and preferably between about 90° C. to 100° C. and heating is continued under mildly acidic conditions until the resin product is advanced to one having a gel time between about 150 and 250 seconds at 150° C.

The resin produced is hard when cooled, and may be ground using a hammer mill or other well known grinding or pulverizing means, to "powder" form which has been found to bge stable under normal storage conditions for substantially more than 6 months. Moreover, the resins which will usually have a viscosity of not more than about 50 centistrokes at 25° C., determined as a 35 weight percent solution in ethanol, are soluble in most polar organic solvents as well as aromatic-oxygenated solvent mixtures, but are relatively insoluble in aliphatic solvents.

The resins of this invention are characterized by a relatively narrow molecular weight distribution and low molecular weight. For example, the "polydispersity" of these resins is low, ranging from about 1.5, or slightly lower, to about 5, or slightly higher. Most typically, the "polydispersity" which is the ratio of weight average molecular weight to the number average molecular weight, is about 1.7 to about 3. The resin is typically a mixture of dimers, trimers, and tetramers as the prevalent components and contains a methylol content capable of condensing during the curing reaction.

The adhesive and coating compositions of the invention, which contain as an essential ingredient the solid resole phenolic resin hereinabove described, may be prepared in "powder," 100% solids form or, if desired, in solution form.

To make 100% solids compositions, the various formulations may be melt mixed at a temperature between about 80° to 140° C. on a 2 or 3 roll mill, in an extruder, or in similar twin screw mills. The melt mix may be extruded into a film or onto a tape support. To prepare the composition in powder form, the mixture may be ground in a hammer mill or pulverized at reduced temperatures through the use of dry ice or liquid nitrogen (cryogenic grinding). Powder forms of the compositions of the invention may also be obtained by spray drying or coagulating a formulation from a low boiling solvent solution. In some cases, the formulation ingredients need not be melt or solution mixed, but can be cold blended as powders.

If desired, the adhesive and coating compositions may be prepared in solution form, the essential solid resole phenolic resin ingredient being soluble in most polar organic solvents and aromatic-oxygenated solvent mixtures.

As is typical with thermosetting resin coating and adhesive compositions, the compositions of the invention may be compounded with various ingredients such as fillers, pigments, flow control agents, clays, leveling agents and the like, to modify adhesive and coating performance, characteristics, and color, as desired. Certain fillers, such as silicas or silane treated silicas and clays, have also been found to be effective as additives that inhibit caking or sintering of powders derived from the mixtures of the invention. Such kinds of fillers and additives are used in amounts that are generally known for the particular material and purpose intended.

It is well known that coating compositions desirably include leveling agents to enhance the surface characteristics of the coating as well as wetting of the substrates being coated. In this regard, it has been found that certain types of silicone-organic copolymer fluids which are siloxane polyoxyalkylene block copolymers containing dimethyl-siloxane units are especially preferred as leveling agents for use in the coating compositions of the invention. Exemplary of such preferred leveling agents are silicone fluids commercially available under the tradename Silicone L-5340 and Silicone L-75 from Union Carbide Corporation.

While the coating and adhesive compositions of the invention may be prepared with the solid resole phenolic resins herein described as the only resin component, formulation of said compositions wherein said solid resole phenolic resin is combined with one or more reactive polymers can lead to materials that exhibit a much wider variety of properties. It has been found that bisphenol-A formaldehyde resole resins prepared in accordance with the practice of the invention are compatible and useful with polymers containing reactive end groups and/or pendant reactive groups along the polymer chain. Typical suitable groups contain an active hydrogen atom such as, for example, carboxyl, hydroxyl, amine, amide, methylol or mercapto groups. Also suitable are groups such as anhydrides, epoxides, and imines. Exemplary of polymers which contain such groups and which are compatible with the solid resole phenolic resin of the invention include phenoxy resins, epoxy resins, polyurethanes, polyamides, polyesters, polyethers, vinyl chloride copolymers, acrylic copolymers, vinyl acetate copolymers and the like. The ratio of resole phenolic resin to functional polymer that may be used varies widely and will generally depend on the properties desired.

The coating and adhesive compositions may be applied by any one of a number of techniques well known in the art. Powder adhesives or coatings may be applied to substrates by electrostatic spray methods which require a relatively small particle size (e.g. <50 mesh, U.S. sieve), Larger particle sizes as well as small particles may be applied by gravure roll, fluid bed, sifting or curtain coating techniques. Prefusing the powdered resin for very short times to adhere then to substrates will permit parts to be assembled later, if desired. Curing of the solid resole phenolic resins occurs rapidly when heated at about 140° C. or higher.

Solution compositions may be applied by spraying, dipping, curtain coating, roller coating and the like, and such compositions will cure rapidly when heated to 140° C. or higher.

The invention will become more clear when considered together with the following examples which are set forth as being merely illustrative of the invention and which are not intended, in any manner, to be limitative thereof. Unless otherwise indicated, all parts and percentages are by weight.

EXAMPLE 1

| Formulation | Parts By Weight, grams |
|---|---|
| Bisphenol-A | 6,000 |
| Formaldehyde (40%) | 4,620 |
| Aqueous Sodium Hydroxide (25%) | 72 |

Into a stainless steel reactor, equipped with a condenser, stirrer, and temperature recording device, there were charged 6,000 grams (26.4 moles) of bisphenol-A, 4,620 grams (61.6 moles) of a 40 percent by weight aqueous solution of formaldehyde, and 72 grams (0.45 moles) of a 25 percent by weight aqueous solution of sodium hydroxide. The mixture was heated to 95° C. under a vacuum of 5 to 6" (Hg) and maintained at 95° C. for 30 minutes while being stirred and during which time 0.12 grams of an antifoam agent (available commercially under the tradename UCC Silicone R-12 from Union Carbide Corporation) was added. The reaction mixture was then cooled to 70° C. and 36 grams of a 41 percent phosphoric acid solution was added to the reaction mixture which adjusted the pH thereof to 6.0. The contents of the reactor were then subjected to a vacuum of 27" (Hg) to strip water from the reaction mixture. The stripping of water was continued while heating the contents of the reactor to a temperature of 95° C. until a sample hot plate gel time of 156 seconds at 150° C. was obtained. The contents of the reactor were then discharged to resin pans, cooled to stop further condensation reactions, and then broken into lumps. The resulting solid resin did not sinter at ambient room temperature and was very light in color.

EXAMPLE 2

A sample of the bisphenol-A/formaldehyde resin of Example 1 was ground to a 100 mesh powder at 20° C. in a hammer mill. This powder was electrostatically sprayed on etched 60 mil and 20 mil aluminum panels. The metal panels were heated at 350° F. (177° C.) in an oven for one minute to fuse the resin powder. The 60 mil aluminum pieces were bonded to form lap shear test joints for 20 minutes at 350° F. (177° C.) under 30 psi pressure. The 20 mil aluminum panels were bonded to canvas (army duck, 10 oz.) to form peel strength test samples for 20 minutes at 350° F. (177° C.) under 30 psi pressure. Reported below in Table 1 are the bond strengths determined.

TABLE 1

| | Adhesive Strength (Average 3 readings each) | | |
|---|---|---|---|
| | Lap Shear Room Temp. | Strength 100° C. | 180° Peel Strength (lbs./ inch width Room Temp. |
| 60 mil alum. panels | 1920 | 1650 | |
| 20 mil alum. panel/canvas The Peel Strength Test | | | 8.5 The canvas strip was pulled at a 180° angle in a tensile testing machine at a grip separation speed of 2 inches per minute. |

EXAMPLE 3

The bisphenol-A/formaldehyde resin of Example 1 was used in this Example.

A sample of the resin was dissolved in ethylene glycol monoethyl ether acetate to prepare a 50 percent solids solution. To forty parts by weight of the solution, 0.05 parts by weight of a leveling agent (commercially available as silicone L-5340 from Union Carbide Corporation) was added and a film was cast (4 mils, wet) on phosphatized 24 ga. steel. The coated panel was immediately baked for 20 minutes at 350° F. (177° C.) and a light color, clear, high gloss coating resulted which exhibited excellent adhesion to the steel substrate.

For comparison purposes, two phenolic type resin solutions available commercially under the tradenames BKS-2315 and BKS-2620 from Union Carbide Corporation were used to prepare coated panels. Both BKS-2315 solution (50 percent solids) and BKS-2620 solution (60 percent solids) were modified with the silicone leveling agent described above in the proportions of 0.050 parts by weight of leveling agent per forty parts by weight of solution and films were cast therefrom (4 mils, wet) on phosphatized steel panels. The coated panels were baked immediately for 20 minutes at 350° F. (177° C.) and, in both cases, typical golden brown phenolic color significantly darker than the coating preparing from the resin of Example 1 was observed.

Further evaluation tests were run on each of the coated panels of this example and the test conditions and results obtained are summarized in Table 2 below.

TABLE 2

| Resin Sample | Fluid Resistance Tests | | | | Salt Spray (5% aqueous salt spray) |
|---|---|---|---|---|---|
| | Methyl Ethyl Ketone (RT) (1 month) | Glacial Acetic Acid (RT) (2 weeks) | Water (100° F.) (1000 hours) | Aqueous Sodium Hydroxide (5%) (RT) (1 week) | (1000 hours) |
| Example 1 Resin | 10% loss in hardness recovers on drying | no change | no effect | no effect | few fine blisters no underfilm corrosion fine blisters |
| BKS-2315 | — | — | — | some blisters | medium to fine blisters |

TABLE 2-continued

| Resin Sample | Fluid Resistance Tests | | | | Salt Spray (5% aqueous salt spray) |
| --- | --- | --- | --- | --- | --- |
| BKS-2620 | failed-swell and lost adhesion | spotted-no recovery | — | — | trace of corrosion |

EXAMPLE 4

The resin of Example 1 was used in this Example. A sample of the resin was melt mixed on a 2 roll mill with silicone leveling agents in the following proportions:

| | A | B |
| --- | --- | --- |
| Example 1 resin | 200 parts by wt. | 200 parts by wt. |
| Silicone leveling agent 1 | 0.5 parts by wt. | — |
| Silicone leveling agent 2 | — | 0.5 parts by wt. |

Silicone leveling agent 1 is available commercially under the tradename Silicone L-5340 and silicone leveling agent 2 is available commercially under the tradename Silicon L-75, both from Union Carbide Corporation.

Each of the formulations were rough ground and then reduced to 100 mesh powder in a hammer mill at 0°-10° C. Each of the powdered resin materials were electrostatically sprayed over phosphatized 24 ga. steel panels and then baked for 15 minutes at 350° F. (177° C.). Each of the coating formulations resulted in light colored, glossy coatings exhibiting good adhesion to the steel substrates. Chemical immersion tests similar to those reported in Example 3 were run on the coated samples of this Example with results obtained similar to that reported in Example 3 for the solution coating prepared with the resin of Example 1.

EXAMPLE 5

Using the stainless steel reactor of Example 1, the following proportion of ingredients are charged therein to prepare Resin Sample A.

| Bisphenol-A | 6000 grams | (26.4 moles) |
| --- | --- | --- |
| Formaldehyde (40%) | 4620 grams | (61.6 moles) |
| Aqueous Sodium Hydroxide (25%) | 72 grams | (.45 moles) |

The mixture is stirred 10 minutes at 33° C. and then heated to 95° C. under a vacuum of 5" (Hg). The mixture is maintained at 95° C. for 60 minutes under reflux while being stirred. Full vacuum is then applied to the mixture and the reaction temperature dropped to 55° C. Ninety grams of a 41% phosphoric acid solution are then added along with 0.12 parts of an antifoam agent (UCC Silicone R-12), reducing the pH of the reaction mixture to 5.3. The contents of the reactor are then heated to 95° C. under a vacuum of 27" (Hg) over a period of 1 hour and forty minutes during which time water is removed from the reaction mixture and the gel time of the resin product is advanced to 237 seconds at 150° C. The molten resin is discharged from the reactor, cooled to a solid, and then broken into lumps. The lumps of solid resin did not sinter during storage at ambient room temperature.

Resin Samples B and C are prepared using the same proportion of ingredients and procedure hereinabove described for Resin Sample A, except that each of these resins are prepared in different sized batches. Resin Sample B is prepared in a glass laboratory reactor and the hard resin product has a gel time measured at 150° C. of 218 seconds. Resin Sample C is prepared in a pilot plant stainless steel reactor and the hard resin product has a gel time measured at 150° C. of 230 seconds.

Resin Sample D is prepared using the same proportions of bisphenol-A and formaldehyde described for Resin Sample A. The reaction time schedule used is similar to that employed in preparing Resin Sample A, but hexamethylenetetramine catalyst (5 parts/100 parts bisphenol-A) is added to the reaction mixture and the reaction mixture is not neutralized with acid during the water removal step. The resin product is soft (sintered) when cooled and had a gel time at 150° C. of 161 seconds.

Each of the Resin Samples A–D are used to prepare a 40 percent solids solution in ethylene glycol monomethyl ether with silicone L-5340 leveling agent, sprayed onto sandblasted steel panels, dried, and then baked for 30 minutes at 350° F. Coatings prepared using Resin Samples A, B, and C all exhibited excellent adhesion to the metal, the same color and smoothness. The coating prepared from Resin Sample D exhibits a somewhat darker color but is otherwise similar to the smoothness and adhesion found for coatings prepared with Resin Samples A, B, and C.

Resin Samples A, B, and C are ground into finely divided powders on a hammer mill. Resin Sample D is too soft to be ground into a powder. The finely divided powders prepared from Resin Samples A, B, and C are stored under ambient temperature conditions for extended periods of time and the shelf aging time and results obtained are summarized in Table 3, below.

TABLE 3

| | Original Gel Time (seconds at 150° F.) | Aging Time | Aged Gel Time (seconds at 150° F.) | Coating Properties After Aging (40% Solids, Silicone Leveling Agent Present) |
| --- | --- | --- | --- | --- |
| Resin Sample A | 237 | 1 year 9 months | 178 | good adhesion, light color |
| Resin Sample B | 218 | 1 year 8 months | 173 | good adhesion, light color |
| Resin Sample C | 230 | 1 year | 193 | good adhesion, light color |

The stored resins did not sinter during the storage period. Coating solutions prepared from each of the resin samples are readily sprayed.

EXAMPLE 6

By procedures analogous to that described in Example 1, bisphenol-A/formaldehyde resins were made from the formulations shown below in Table 4, using the reaction conditions indicated:

TABLE 4

| Components And Reaction Conditions | Run No. 1 | | Run No. 2 | |
|---|---|---|---|---|
| Bisphenol-A | 1500 gms. | (6.6 moles) | 6000 gms. | (26.4 moles) |
| Aqueous Sodium Hydroxide (25%) | 18 gms. | (0.11 moles) | 72 gms. | (0.45 moles) |
| Phosphoric Acid (85%) | 4.5 gms. | | 30 gms. | |
| Water | 4.5 gms. | | 30 gms. | |
| Reaction Temp. °C. (initial) | 95° C. | | 95° C. | |
| Reaction Time (initial) | 1 hour | | 1 hour | |
| Reaction pH | 9.5 | | 9-10 | |
| Water removal Temp. | 55° C.-95° C. | | 55° C.-104° C. | |
| Dehydration Time | 2 hours | | 1 hour 40 minutes | |
| Final pH | 4.9 | | 5 | |
| 150° C. Gel Time, seconds | 198 | | 165 | |

The resin samples of Run No.'s 1 and 2 were dissolved in methyl isobutyl ketone to prepare solutions with 40% by weight of non-volatile materials. Silicone L-5340 (leveling agent) was added to each solution in the amount of 0.1 percent by weight. A similar solution was prepared using the resin product of Example 1. Each of the solutions were used to cast 5 mil wet films on phosphatized steel panels which were subsequently dried and baked for 20 minutes at 350° F. The coated panels were subjected to various coatings tests the results of which are summarized in Table 5, below.

TABLE 5

| Test Conditions | Resin Sample | | |
|---|---|---|---|
| | Run No. 1 | Run No. 2 | Ex. I |
| Color | excellent | excellent | excellent |
| Water immersion 100° F. 1000 hrs. | no change | no change | no change |
| Salt Spray 5% NaCl, 95° F. | | | |
| Blistering | none | med. fine | none |
| Underfilm Corrosion | none | trace | none |
| 4 Weeks in Toluene | no change | no change | no change |
| 4 Weeks M.E.K. | slight softening (recovers) | softening | slight softening (recovers) |
| 1 Week in 5% NaOH | no change | some spotting | no change |
| 2 Weeks in Glacial Acetic Acid | no change | slight blisters | no change |

As can be determined from the results reported above, resins prepared in Run No. 1 of this Example and in Example 1 are about equal in baked coating performance. However, it was noted that the resin prepared in Run No. 1 gave off an excessively high formaldehyde odor during the baking cycle which was judged to be barely acceptable. The baked coating performance of the resin prepared in Run No. 2 were somewhat lower in chemical resistance and was judged to be just acceptable as a self-crosslinking system.

EXAMPLE 7

This Example illustrates the effect of various leveling agents based on liquid silicone oils or silicone-organic copolymers on coatings prepared with the resole resin of the present invention. A series of solution coating compositions at 40% by weight resin solids in ethylene glycol monoethyl ether were prepared using the following proportion of ingredients in parts by weight:

| | | A | B | C | D | E | F | G |
|---|---|---|---|---|---|---|---|---|
| Bis-A/Formaldehyde | Resin (40%) | 200 | 200 | 200 | 200 | 200 | 200 | 200 |
| Silicone L-5340 | (copolymer) | 0.3 | — | — | — | — | — | — |
| Silicone L-75 | (copolymer) | — | 0.3 | — | — | — | — | — |
| Silicone L-76 | (copolymer) | — | — | 0.3 | — | — | — | — |
| Silicone L-77 | (copolymer) | — | — | — | 0.3 | — | — | — |
| Silicone L-78 | (copolymer) | — | — | — | — | 0.3 | — | — |
| Silicone L-45 | (dimethylsiloxane) | — | — | — | — | — | 0.3 | — |

Resin Sample C of Example 5 having a gel time at 150° C. of 230 seconds was employed in preparing the coating compositions of this Example. The silicone fluids used are commercially available from Union Carbide Corporation.

All the coating solutions were sprayed on plain, cold rolled steel panels, air dried two minutes, and baked for 20 minutes at 350° F. The average film thickness was 0.8 mils. Visual inspection indicated that coatings applied from formulations A and B were clear, smooth and glossy. Coatings applied from formulation G, which did not contain any leveling agent additive, exhibited a slight "orange peel" surface. Coatings prepared from formulations C, D and E, exhibited a number of undesirable surface defects, while the coating prepared from formulation F did not wet the substrate surface.

EXAMPLES 8-12

These examples illustrate the use of the bisphenol-A/formaldehyde resole resins of the invention in combination with other reactive polymers for preparing adhesive and coating compositions.

EXAMPLE 8

The bisphenol-A resole resin of Example I was used in preparing a coating composition having the following proportion of ingredients:

| | |
|---|---|
| Bisphenol-A resole resin | 500 parts by weight |

-continued

| | |
|---|---|
| Solid commercial bis-A-epichlorolydrin epoxy resin (EPON-1004, Shell Chemical Co.) | 500 parts by weight |
| Silicone L-75 | 4 parts by weight |

A rough ground, dry blend of the ingredients was melt mixed in an extruder with a barrel temperature of 110° C. The extrudate was rough ground and then fine ground in a hammer mill at −40° C. so that 100% of the material passed through a 60 mesh sieve. The powder was electrostatically sprayed on phosphatized steel and baked for 10 minutes at 400° F. (205° C.). A glossy, light colored coating with good adhesion to the substrate was obtained which exhibited good resistance to salt spray (5% salt spray, 95° F., 1000 hours) and water immersion (1000 hours at 100° F.).

EXAMPLE 9

The bisphenol-A resole resin of Example I was used in preparing a coating composition having the following proportion of ingredients:

| | |
|---|---|
| Bisphenol-A type epoxy resin (eg. wt. 525) | 350 parts by wt. |
| Bisphenol-A resole resin (Example I) | 150 parts by wt. |
| Dicyandiamide | 20 parts by wt. |
| TiO$_2$ | 120 parts by wt. |
| Silicone L-75 | 2.5 parts by wt. |

The ingredients were melt mixed on a 2 roll mill at 100° C., rough ground and then fine ground in a hammer mill at −40° C. to a 100 mesh powder. The powder composition was electrostatically sprayed on phosphatized steel panels and baked for 15 minutes at 400° F. (205° C.), producing a smooth coating about 1 mil thick that had a white color and good chemical resistance to various solvent materials. Baking the coated panels for one hour at 400° F. (205° C.) turned the coating to an "oyster" white color with no streaks indicating good heat stability and color resistance.

EXAMPLE 10

The bisphenol-A resole resin of Example I was used in preparing coating compositions having the following proportion of ingredients:

| | Parts By Weight | | |
|---|---|---|---|
| Ingredients | A | B | C |
| Commercial Vinyl Chloride Resin 1 25% N.V. in HIBK | 40 | — | — |
| Commercial Vinyl Chloride Resin 2 25% N.V. in MIBK | — | 40 | — |
| Phenoxy Resin 32% in Cellosolve Acetate | — | — | 31.3 |
| Bisphenol-A/Formaldehyde Resin (Example I) 50% Solids in Cellosolve Acetate | 10 | 10 | 10 |
| Ethylene Glycol Monoethyl Ether Acetate | — | — | 5 |
| Tin Mercaptide Stabilizer | 0.1 | 0.1 | — |

The commercial vinyl chloride resin no. 1 contained 83 parts by weight vinyl chloride, 16 parts by weight vinyl acetate, 1 part by weight maleic acid. Commercial vinyl chloride resin no. 2 contained 91 parts by weight vinyl chloride, 3 parts by weight vinyl acetate, 6 parts by weight vinyl alcohol groups. The phenoxy type resin was purchased under the tradename EPONOL 55L-32 from Shell Chemical Co. The resole resin of Example I was prepared as a 50% solids solution in "EGMEA."

Each coating composition was cast as a 4 mil wet film on a phosphatized steel panel, air dried 15 minutes, and then baked for 10 minutes at 350° F. (177° C.). All the coatings were compatible, clear, glossy films that exhibited good adhesion to the metal substrate.

EXAMPLE 11

The bisphenol-A resole resin of Example I was used in preparing an adhesive composition having the following proportion of ingredients:

| | |
|---|---|
| Polyvinyl Butyral Resin | 100 parts by weight |
| Bisphenol-A resole (Example I) | 100 parts by weight |

The ingredients were melt mixed on a two-roll mill at 200°–220° F. (93° C.–105° C.) for 3 minutes and the formulation was then cryogenically ground to a 60 mesh (max) powder. The powder was coated on mill finish aluminum panels and prefused for 30 seconds at 400° F. (205° C.). Canvas (army duck, 10 oz.) was laminated onto the metal panels at 350° F. (177° C.) for 10 minutes at 30 psi. Peel strengths (180°) of an average of 4 samples were found to be 9.2 lbs/in width).

Lap shear test specimens were prepared from 60 mil etched aluminum panels at a 3 mil glue line cured for 10 minutes at 350° F. (177° C.) under 30 psi. The lap shear strength at room temperature was 4880 psi, and at 75° C., 3020 psi.

EXAMPLE 12

An adhesive composition having the following proportion of ingredients was prepared:

| | Parts By Weight | |
|---|---|---|
| Ingredients | A | B |
| Phenoxy Resin | 100 | 100 |
| Bis-A resole resin (Example I) | 10 | — |
| Commercial Phenolic Resin | — | 10 |

The phenoxy resin used is commercially available under the tradename Phenoxy Resin PKHA from Union Carbide Corporation. The commercial phenolic resin is commercially available under the tradename BKR-2620 from Union Carbide Corporation.

Each of the formulations were melt mixed on a 2 roll mill at 100°–110° C. and then cryogenically ground to form adhesive powders. Using the test procedures described in Example 2, the peel and lap shear bond strengths were determined and the results are reported in Table 6, below.

TABLE 6

| | Composition | |
|---|---|---|
| | A | B |
| 180° Peel Strength (lbs/in width) RT | 25.9 | 24.3 |
| 100° C. | 21.9 | 9.9 |
| Lap Shear Strength (psi) RT | 5600 | 1960 |
| 100° C. | 2140 | 414 |

The results indicate that the peel and shear adhesion strengths of the adhesive containing the bisphenol-A/formaldehyde resole resin of the invention was clearly superior to the commercial phenolic resin with which it was compared.

What is claimed is:

1. A coating and adhesive composition comprising a solid phenolic resole resin having a gel time of between about 150 seconds to about 250 seconds at 150° C., said resin being the reaction product of 2,2-bis(4-hydroxyphenyl) propane and formaldehyde at a mole ratio of from about 2.11 to about 2.64 moles of formaldehyde per mole of 2,2-bis(4-hydroxyphenyl) propane in the presence of a catalytic quantity of a condensation catalyst selected from the group consisting of an alkali metal hydroxide, barium oxide, and barium hydroxide at a temperature of at least about 70° C. that is acidified to a pH of from about 3 up to 7.0 and dehydrated.

2. The composition of claim 1 in which said phenolic resole resin is in a finely divided powder form.

3. The composition of claim 1 wherein said solid resin cures at a temperature of at least about 140° C.

4. The composition of claim 1 wherein said solid phenolic resole resin is a finely divided powder adhesive that cures at a temperature of at least about 140° C.

5. The composition of claim 1 wherein said solid phenolic resole resin is a finely divided powder that cures to a continuous coating at a temperature of at least about 140° C.

6. A coating and adhesive composition comprising said solid phenolic resole resin of claim 1 dissolved in a suitable solvent therefor.

7. The composition of claim 6 wherein said resin solution is a coating material that cures to a continuous coating at a temperature of at least about 140° C.

8. The composition of claim 7 wherein said resin solution includes a siloxane copolymer leveling agent.

9. The composition of claim 1 comprising a combination of said phenolic resole resin and a compatible reactive polymer that will crosslink with said resole resin.

10. The composition of claim 9 wherein said combination of reactive polymer and phenolic resole resin is in finely divided powder form.

11. The composition of claim 9 wherein said reactive polymer is selected from the group consisting of epoxy, phenoxy, vinyl chloride copolymers and polyurethane resins.

* * * * *

UNITED STATES PATENT AND TRADEMARK OFFICE
CERTIFICATE OF CORRECTION

PATENT NO. : 4,182,732
DATED : January 8, 1980
INVENTOR(S) : J.S. Fry

It is certified that error appears in the above—identified patent and that said Letters Patent is hereby corrected as shown below:

In "TABLE 4" (columns 9 and 10) under the line relating to the amount of "Bisphenol A" employed, insert the omitted line
---Formaldehyde (40%) 1307gms. (17.4 moles) 4200gms. (56 moles) --.

*Signed and Sealed this*

*Fourth* Day of *August 1981*

[SEAL]

*Attest:*

*Attesting Officer*

GERALD J. MOSSINGHOFF

*Commissioner of Patents and Trademarks*